United States Patent [19]

Maeda et al.

[11] Patent Number: 4,824,193
[45] Date of Patent: Apr. 25, 1989

[54] HOLOGRAPHIC MULTIPLEXER/DEMULTIPLEXER AND ITS MANUFACTURING METHOD

[75] Inventors: Teizou Maeda; Toshihiro Kubota, both of Hirakata; Hiroyuki Ishii, Hokkaido, all of Japan

[73] Assignee: Matsushita Electric Industrial Co., Ltd., Osaka, Japan

[21] Appl. No.: 889,890

[22] Filed: Jul. 25, 1986

[30] Foreign Application Priority Data

Jul. 26, 1985 [JP] Japan .................................. 60-165124
Jul. 26, 1985 [JP] Japan .................................. 60-165125
Sep. 30, 1985 [JP] Japan .................................. 60-217008
Sep. 30, 1985 [JP] Japan .................................. 60-217009

[51] Int. Cl.[4] ............................ G02B 5/32; G02B 6/34
[52] U.S. Cl. .................................. 350/3.72; 350/96.19
[58] Field of Search ...................... 350/3.7, 96.19, 3.72

[56] References Cited

U.S. PATENT DOCUMENTS

| | | | |
|---|---|---|---|
| 4,198,117 | 4/1980 | Kobayashi | 350/96.19 |
| 4,355,858 | 10/1982 | Funato et al. | 350/3.72 |
| 4,359,259 | 11/1982 | Horner et al. | 350/3.7 |
| 4,364,627 | 12/1982 | Haines | 350/3.83 |
| 4,387,955 | 6/1983 | Ludman et al. | 350/96.19 |

FOREIGN PATENT DOCUMENTS 58-79207 5/1983 Japan .

OTHER PUBLICATIONS

Born et al., *Principles of Optics* 4th Edition, 1970 Pergamon Press, N.Y. pp. 412-413.
Tomlinson et al., "Optical Multiplexer for Multimode Fiber Transmission" Applied Physics Letters, vol. 31, No. 3, Aug. 1, 77, pp. 169-170.
Watanabe et al., "Slab Waveguide Demultiplexer for Multimode Optical Transmission in the 1.0-1.4-$\mu$m Wavelength Region", Applied Optics, vol. 19, No. 21, Nov. 1, 1980, pp. 3808-3591.
Philippe et al. Wavelength Demultiplexer: "Using Echelette Coatings on a Silicon Substrate", *Applied Optics*, vol. 24, No. 7, Apr. 1, '85, pp. 1006-1011.

*Primary Examiner*—Bruce Y. Arnold
*Attorney, Agent, or Firm*—Wenderoth, Lind & Ponack

[57] ABSTRACT

A holographic multiplexer and holographic demultiplexer, which has a diffraction grating formed of a hologram with an interference pattern produced by interference of two wave fronts, of which at least one wave front is of an aspherical wave and the other is of, for example, a spherical wave, and its manufacturing method are disclosed. The aspherical wave is used for correction of aberration and provided by obtaining the phase function $\phi_G$ of the aspherical wave using a computer generated hologram and through an optical method or an electron-beam direct drawing method. The hologram serving as the diffraction grating for the holographic multiplexer/demultiplexer is produced by a two-beam interference method of an electron-beam direct drawing method. As the result, a holographic multiplexer/demultiplexer having a high degree of multiplexing, which is compact in size, and exhibiting low loss of light can be provided.

20 Claims, 5 Drawing Sheets

HOLOGRAPHIC MULTIPLEXER/DEMULTIPLEXER AND ITS MANUFACTURING METHOD

BACKGROUND OF THE INVENTION

1. Field of the Invention

The present invention relates to a multiplexer/demultiplexer for use in optical-fiber communications and its manufacturing method.

2. Description of the Prior Art

As one of the methods to transmit a plurality of signals in the optical-fiber communications field, there is a transmission technique of wavelength division multiplexing. Since this technique enables such actions as bi-directional communication and the simultaneous transmission of different signals and makes it possible to increase transmission capacity and decrease system costs, it is a powerful technique in the optical-fiber communications field.

In the wavelength division multiplexing transmission, an optical multiplexer for combining a plurality of optical signals having different wavelengths in a single optical fiber on the transmitting side and an optical demultiplexer for separating a received signal into a plurality of optical signals of different wavelengths on the receiving side are very important components.

As the optical multiplexer and optical demultiplexer, devices of the diffraction grating type and of interference film filter type are generally used. In the case where the degree of multiplexing is higher, the diffraction grating type is more useful.

As the optical multiplexers and demultiplexers using diffraction gratings, one type using a planar, linear grating as disclosed in U.S. Pat. No. 4,198,117 and another type using a concave, curved grating disclosed in U.S. Pat. No. 4,387,955 are so far known. Among these, the one using a planar, linear grating has the grating fabricated by a mechanical ruling method or a holographic method by interference of one plane wave and another plane wave, and the other using a concave, curved grating has the grating produced by mechanical ruling or a holographic method by interference of one spherical wave and another spherical wave. However, in these optical multiplexers and optical demultiplexers, the one using the planar, linear grating has a drawback that it requires a part similar to a lens, namely, a light-focusing transmission body, a convergent lens, a collimation lens, and the like as described in U.S. Pat. No. 4,198,117 and its optical system becomes complex. The other one using a concave, curved grating, though not requiring any convergent lens or collimation lens, has a drawback that it is difficult to fabricate since it is shaped in a concave form and therefore it becomes expensive.

SUMMARY OF THE INVENTION

A primary object of the present invention is to provide a holographic multiplexer/demultiplexer having a high degree of multiplexing, which is compact in size, and exhibiting low loss of light, and to provide a method for manufacturing the same.

According to the present invention, a hologram is produced by interference of two wave fronts, one of which has the shape of an aspherical wave and the other which has the shape of a spherical wave or an aspherical wave. The aspherical wave for the one wave front is used for correction of aberration. Therefore, although the grating has a plane form, it can provide a high degree of multiplexing. The aspherical wave is provided by a computer generated hologram (CGH) and the computer generated hologram is produced by an optical method or by an electron beam direct drawing method.

According to the present invention, the hologram serving as a diffraction grating for the optical multiplexer/demultiplexer is fabricated by a two-beam interference method or electron-beam direct drawing method using a computer generated hologram. The two-beam interference method is such that a laser beam is split into two beams by a beam splitter, one serving as an object wave and the other serving as a reference wave, and a hologram is made by interference between the two waves. By using, for the object wave, a wave front having an aspherical wave or a combination of an aspherical wave and a spherical wave, correction of aberration is achieved. For the reference wave, a spherical wave is usually used but an aspherical wave may be used.

In the making of the computer generated hologram, a phase function $\phi_H$ of the hologram serving as the diffraction grating for the optical demultiplexer or a phase function $\phi_G$ of the aspherical wave is obtained by calculation. In obtaining the phase function $\phi_G$ of the aspherical wave, the direction cosine of the reconstructed image ray is obtained, a ray tracing is made for each wavelength and the value of dispersion of each spot diagram is obtained, and the damped least square method (DLS) is used so that the average of the value of dispersion obtained for each wavelength may be made a minimum and thereby coefficients $C_{ij}$ or $C_{ij}'$ corresponding to an optimum aspherical wave front are obtained by calculation.

There are two ways for producing the hologram film serving as the diffraction grating,—one irradiating the object wave and the reference wave upon the holographic photosensitive layer from one side and the other from both sides. A transparent type hologram is obtained by the former method and a reflective type hologram is obtained by the latter method. By applying a reflective film of gold to a transparent type hologram, it can be turned into a reflective type. Thus, the holographic multiplexer/demultiplexer can be made as either the reflective or the transparent type.

The holographic multiplexer/demultiplexer and input and output optical fibers are arranged so that the reconstructing wave and reconstructed image wave are respectively in the same conditions as those of the reference wave and object wave for producing the holographic film. With is arrangement, a holographic multiplexer/demultiplexer having a high degree of multiplexing is provided.

Further, according to the present invention, the holographic multiplexer/demultiplexer in which the input and output optical fibers are arranged adjacent to each other, namely, in the manner of the so-called Littrow mounting, can be provided.

BRIEF DESCRIPTION OF THE DRAWINGS

FIG. 3 (A) is a conceptual drawing of a holographic demultiplexer using the hologram produced in FIG. 1 and then provided with a reflective film as a reflective type diffraction grating;

FIG. 3 (B) is an enlarged view of the reflective type diffraction grating formed of the hologram produced in FIG. 1 and then provided with a reflective film thereto;

DESCRIPTION OF THE PREFERRED EMBODIMENTS

Manufacturing methods for the diffraction gratings and the holographic multiplexer/demultiplexer using the diffraction grating will be described in the following with reference to FIGS. 1 to 18.

In the present invention, to manufacture a diffraction grating in a plane form, showing small aberration, a hologram is produced by interference between two wave fronts, one of which is in the shape of an aspherical wave and the other of which may be in the shape of a spherical wave or an aspherical wave. While the aspherical wave can be a single aspherical wave, it may also be a substantially aspherical wave that is provided by incorporating a spherical wave in an aspherical wave. The aspherical wave can be produced by passing a laser beam through a properly designed computer generated hologram (CGH). The computer generated hologram can be produced either by an electron beam direct drawing method or by an optical method to reduce in size that which has been drawn by a plotter. The hologram produced by the electron beam direct drawing method is more accurate and better.

Figures 1, 2:
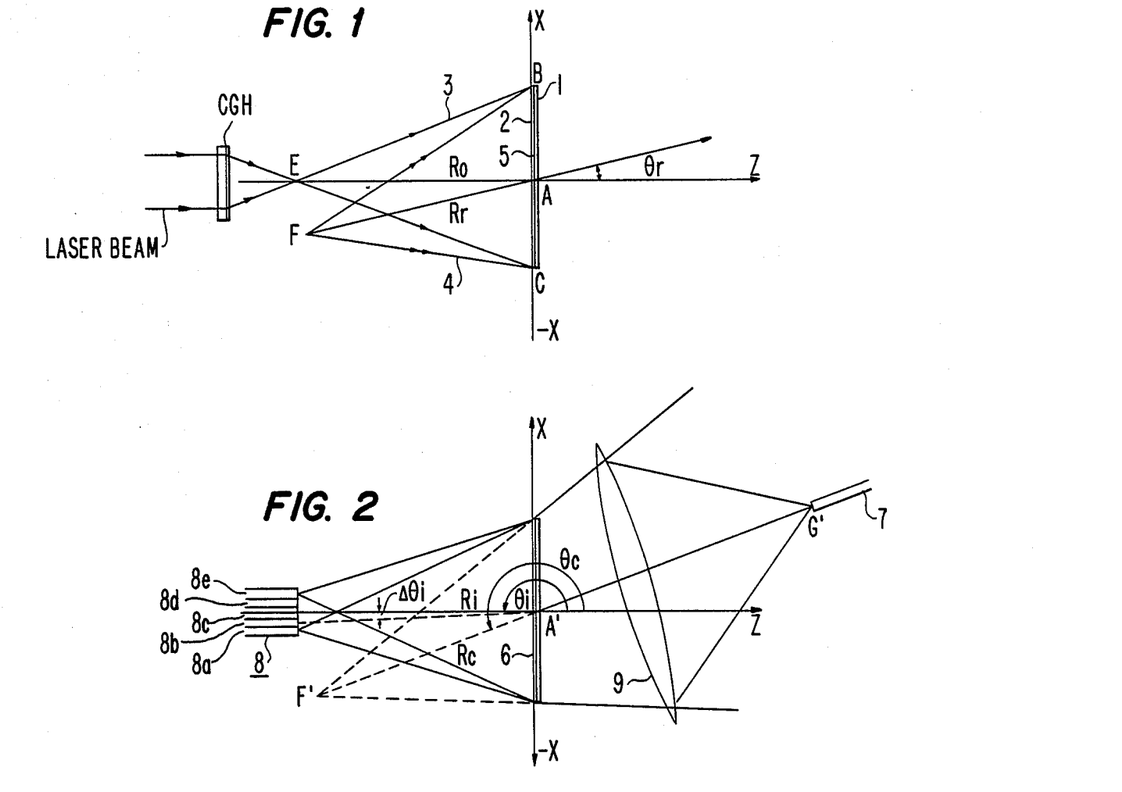
FIG. 1 is a diagram showing a method for producing a hologram by irradiating a divergent aspherical object wave and a divergent spherical reference wave upon a holographic photosensitive layer from one side thereof.
FIG. 2 is a conceptual drawing of a holographic demultiplexer using the hologram produced in FIG. 1 as a transparent type diffraction grating.

In the production of the hologram, a divergent or convergent aspherical wave and a divergent or convergent wave of a laser beam are used as the object wave and the reference wave and these are introduced so as to irradiate a photosensitive layer from both sides or one side thereof to expose the holographic photosensitive layer. Then, by developing the layer, a hologram having interference fringes therein is provided. FIGS. 1 to 6 are for showing a first embodiment of the present invention. FIG. 1 is a diagram showing a method of producing a hologram by irradiating a divergent aspherical object wave and a divergent spherical reference wave upon a holographic photosensitive layer from one side thereof. That is, the X axis is on the surface of the holographic photosensitive layer 2 formed on a transparent substrate 1, and the Z axis is in the direction perpendicular to the surface, with the center of the holographic photosensitive layer 2 denoted by A and the ends thereof denoted by B and C. A divergent aspherical object wave 3 is made to diverge from the point E, which is located on the Z axis at an object beam distance $R_0$ from A, in the direction of the Z axis, namely, in the direction at an object beam angle $\phi_0=0$ with reference to the principal ray. A divergent spherical reference wave 4 is made to diverge from the same side as the divergent aspherical object wave 3 from the point F, which is located at a reference wave distance $R_r$ from A and in the direction at a reference wave angle $\phi_r$ with reference to the principal ray with respect to Z axis, in the direction at the angle of $\phi_r$. Thus, the holographic photosensitive layer 2 is exposed, and then developed so that a hologram 5 with interference fringes formed therein is produced. If the hologram 5 is used as a diffraction grating as it is, it becomes a transparent type diffraction grating and the reconstructing wave of a laser beam is transmitted therethrough. To make it a reflective type diffraction grating, a reflective film of gold, aluminum, or the like is formed on a surface of the hologram. When the holographic photosensitive layer is thick, a volume hologram is formed, and when it is thin a plane hologram is formed. The volume hologram provides narrow frequency selectivity and the degree of wavelength multiplexing is limited to only two or three waves. So, for a multiplexer/demultiplexer with a higher degree of multiplexing, a plane hologram is useful. In case of the plane hologram, however, it is necessary to shape the surface in a saw-tooth form so that diffraction efficiency is improved.

Figure 3A:
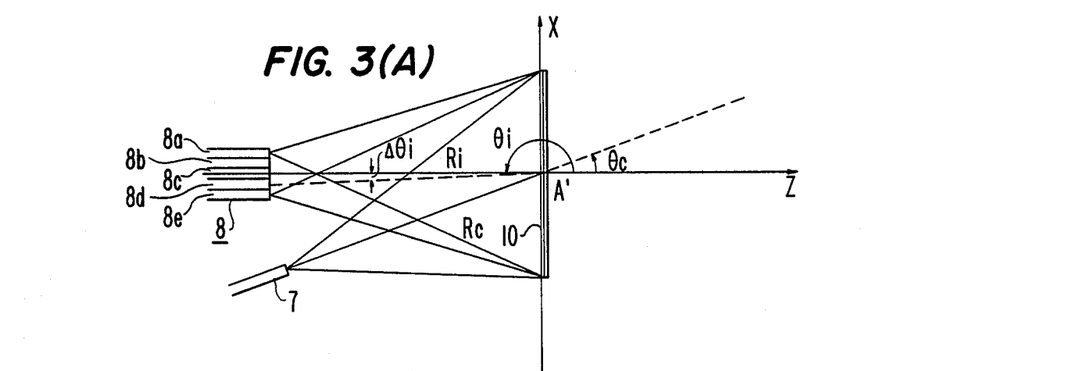

FIG. 2 and FIG. 3A are conceptual drawings of a holographic demultiplexer in which a transparent type diffraction grating 6 and a reflective type grating 10, respectively, and an input optical fiber 7, and an output optical fiber group 8 made up of output optical fibers 8a, 8b, 8c, 8d, and 8e are arranged in a similar arrangement to that in the formation of the hologram in FIG. 1. First, the arrangement of FIG. 2 will be described comparing it to FIG. 1. The transparent type diffraction grating 6 made up of the hologram 5 is placed perpendicularly to Z axis with its center denoted by A′. The tip of the input optical fiber 7 is placed in the position G′, which is the reconstruction conjugate point of the point F′, located in the direction of the reconstructing wave angle $\phi_c$, equal to $\phi_r+180°$, with reference to the principal ray with respect to the Z axis and at the reconstructing wave distance $R_c$, equal to $R_r$, from A′. The tip of the output optical fiber 8c is placed in position on the Z axis corresponding to the reconstructed image point distance $R_i$ which is equal to $R_0$. The fibers of the output optical fiber group 8 made up of output optical fibers 8a, 8b, 8d, and 8e are placed on both sides of the output optical fiber 8c adjacent thereto as shown in the drawing. A multiplexed input optical signal incorporating wavelengths $\lambda_1$, $\lambda_2$, $\lambda_3$, $\lambda_4$, and $\lambda_5$ therein is introduced through the input optical fiber 7 and converged by the convergent lens 9 so as to irradiate upon the transparent grating 6, whereupon the input signal is diffracted and demultiplexed thereby and the respective wavelengths enter the output optical fibers 8a, 8b, 8c, 8d, and 8e to be led out therethrough.

Figure 3B:
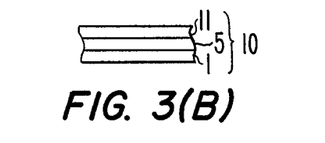

The arrangement in FIG. 3 (A) will next be described comparing it to FIG. 1. The reflective type diffraction grating 10 is, as indicated in the enlarged drawing of FIG. 3 (B), prepared by forming a reflective film 11 of gold on the surface of the hologram 5 formed on the substrate 1. The same is placed perpendicularly to the Z axis. The tip of the input optical fiber 7 is placed in the position in the direction at the angle $\theta_c$, equal to the angle $\phi_r$, with respect to the Z axis at the distance $R_c$, equal to $R_r$. Further, the tip of the output optical fiber 8C is placed in position on the Z axis at the reconstructed image distance $R_i$, equal to $R_o$. Thereupon the output optical fiber group 8 made up of the output optical fibers 8a, 8b, 8c, 8d, and 8e are arranged close to each other as shown in the drawing. If a multiplexed input optical signal incorporating wavelengths $\lambda_1$, $\lambda_2$, $\lambda_3$, $\lambda_4$, and $\lambda_5$ therein is introduced through the input optical fiber 7, the signal is reflected, diffracted, and demultiplexed by the reflective grating 10, and the respective wavelengths enter the output optical fibers 8a, 8b, 8c, 8d, and 8e corresponding to their wavelengths to be led out therethrough. In the present case, an advantage over the transparent type device of FIG. 2 is obtained in that the convergent lens 9 is not required.

The arrangement in FIG. 1 and FIG. 2 is determined according to the image formation equations:

$$\frac{1}{R_i} = \frac{1}{R_c} - \mu\left(\frac{1}{R_o} - \frac{1}{R_r}\right) \quad (1)$$

$$\sin\theta_i = \sin\theta_c - \mu(\sin\theta_o - \sin\theta_r) \quad (2)$$

where
$\mu = \lambda_c/\lambda_o$
$R_i$ = reconstructed image point distance
$R_c$ = reconstructing wave distance
$R_o$ = object wave distance
$R_r$ = reference wave distance
$\lambda_c$ = reconstruction wavelength
$\lambda_o$ = record wavelength
$\theta_i$ = reconstructed image wave angle with reference to principal ray
$\theta_c$ = reconstructing wave angle with reference to principal ray
$\theta_o$ = object wave angle with reference to principal ray
$\theta_r$ = reference wave angle with reference to principal ray, and by the below mentioned specific design method of the holographic demultiplexer. One arrangement is such that the demultiplexed wavelengths are 800 nm, 820 nm, 840 nm, 860 nm, and 880 nm, the outer diameter of the optical fiber is 300μ, and the core diameter of the optical fiber is 200μ. Since the object wave is diverged in the direction of the Z axis, the object wave angle with reference to the principal ray $\theta_o=0$. The reconstructing wave angle with reference to the principal ray $\theta_c$, or the reference wave angle with reference to the principal ray $\theta_r$, is determined such that the image forming point of the center wavelength will be on the Z axis when the center wavelength λ center = 840 nm and the image forming points of the wavelengths differing by 20 nm of increments or decrements from the λ center wavelength are be shifted by 0.3 mm in the direction of +X or −X for each increment or decrement. Since the record wavelength is 514.5 nm in the case where Ar laser is used, $$\mu_1 = \lambda_{center}/\lambda_0 = 840/514.5 = 1.63.$$

Making the object wave angle with reference to the principal ray $\theta_o=0$ and the reconstructed image angle with reference to the principal ray $\theta_i=180°$, we obtain from equation (2)

$$\sin\theta_r = -(1/\mu)\sin\theta_c.$$

When the reconstruction wavelength is $\lambda_{center}+\Delta\lambda$, $$\mu_1' = (\lambda_{center}+\Delta\lambda)/\lambda_0.$$

Therefore, $$\begin{aligned}\sin\theta_i' &= \sin(\theta_i + \Delta\theta_i) \\ &= \sin\theta_c - \mu_1'(\sin\theta_o - \sin\theta_r).\end{aligned} \quad (3)$$

Hence, $$\sin\Delta\theta_i = -(\Delta\lambda/\lambda_{center})\sin\theta_c.$$

Supposing $\Delta\theta_i$ to be sufficiently small, $$\sin\Delta\theta_i \approx \Delta\theta_i.$$

The displacement in the X direction, Δx, is given by $$\Delta x = -R_i\Delta\theta_i = R_i\frac{\Delta\lambda}{\lambda_{center}}\sin\theta_c \quad (4)$$

$$\theta_c = \sin^{-1}\left(\frac{\Delta X}{R_i}\frac{\lambda_{center}}{\Delta\lambda}\right). \quad (5)$$

Therefore, as the wavelength becomes larger, the image forming point is shifted in the positive direction of X axis.

$R_1$ is determined by the numerical aperture, NA, of the optical fiber and the dimensions of the hologram, i.e., the diffraction grating. Supposing NA of the optical fiber to be 0.2 and the dimensions of the diffraction grating to be 15×15 mm, $$R_i = (15/2) \times \{-\cot(\sin^{-1} 0.2)\} = 36.74 \text{ mm}.$$

Substituting in equation (5) the above value of $R_i$, $\lambda_{center} = 840$ nm, $\Delta\lambda = 20$ nm, $\Delta X = 0.3$ mm (corresponding to the outer diameter of the optical fiber), we obtain $$\theta_c = 20.06° + 180°.$$

If the record wavelength of the hologram is 514.5 nm according to the Ar laser, the reconstruction wavelength is 800 nm to 880 nm. Therefore, aberration occurs. Spherical aberration coefficient S, comatic aberration coefficient C, and astigmatic aberration coefficient A are respectively given by $$S = \frac{1}{R_c^3} - \mu\left(\frac{1}{R_o^3} - \frac{1}{R_r^3}\right) - \frac{1}{R_i^3} \quad (6)$$

$$C = \frac{\sin\theta_c}{R_c^2} - \mu\left(\frac{\sin\theta_o}{R_o^2} - \frac{\sin\theta_r}{R_r^2}\right) - \frac{\sin\theta_i}{R_i^2} \quad (7)$$

$$A = \frac{\sin^2\theta_c}{R_c} - \mu\left(\frac{\sin^2\theta_o}{R_o} - \frac{\sin^2\theta_r}{R_r}\right) - \frac{\sin^2\theta_i}{R_i}. \quad (8)$$

By making $R_o = R_r$ in equation (1), the change in the image forming distance by the wavelength ratio $\mu$ can be eliminated. Therefore, by making $R_i = R_c$, we obtain $$S = 0.$$

And, by making $R_i = R_o$, $\theta_i = 180°$, and $\theta_c = 0°$, we obtain $$C = (1/R_c^2)(\sin\theta_c + \mu \sin\theta_r),$$

and to make $C = 0$, $$\theta_r = \sin^{-1}\{-(1/\mu)\sin\theta_r\} \quad (9)$$
$$= 12.12°.$$

At this time, the astigmatic aberration coefficient A becomes $$A = 1.24 \times 10^{-3} \text{ mm}^{-1},$$

that is, there still remains some astigmatism.

The above described conditions for producing the hologram are arranged as follows:

$$\left.\begin{array}{l} R_i = R_c = R_o = R_r = 36.74 \text{ mm} \\ \theta_i = 180° \\ \theta_c = 20.06° + 180° \\ \theta_o = 0° \\ \theta_r = 12.12° \end{array}\right\} \quad (10)$$

With regard to the center wavelength at the time of reconstruction, the spherical aberration and comatic aberration could be removed but there still remains astigmatism, and as to the wavelengths other than the center wavelength, there still remain, though not large, comatic aberration and defocus resulting from slight differences in the reconstructed image point distances due to differences in the wavelengths. These aberrations can be corrected by adding an aspherical wave to the object wave. The aspherical wave is produced by means of the computer generated hologram. The computer generated hologram is obtained by using the phase function of a wave front.

Generally, the phase function of the hologram $\phi_H$ is the difference between the phase function $\phi_o$ of the object wave and the phase function $\phi_r$ of the reference wave, namely, $$\phi_H = \phi_o - \phi_r. \quad (11)$$

When an aspherical wave whose phase function is $\phi_G$ is added to the object wave, $$\phi_H = (\phi_o + \phi_G) - \phi_r. \quad (12)$$

Since $\phi_o$ and $\phi_r$ are spherical waves, $$\phi_o = (2\pi/\lambda_o)[\sqrt{(R_o\cos\theta_o)^2 + (R_o\sin\theta_o + X)^2 + Y^2} - R_o] \quad (13)$$

$$\phi_r = (2\pi/\lambda_o)[\sqrt{(R_r\cos\theta_r)^2 + (R_r\sin\theta_r + X)^2 + Y^2} - R_r]. \quad (14)$$

By introducing therein the equation (10) and $\lambda_o = 514.5$ nm, they are expressed as functions of X and Y.

The phase function $\phi_G$ of the aspherical wave is given as a function of X and Y by:

$$\begin{aligned}
\phi_G &= (2\pi/\lambda_o)\left(\sum_{i,j} C_{ij} X^i Y^j\right) \\
&= 2\pi\left(\sum_{i,j} C_{ij}' X^i Y^j\right) \\
&= 2\pi(C_{20}'X^2 + C_{40}'X^4 + C_{60}'X^6 + C_{80}'X^8 + \\
&\quad C_{02}'Y^2 + C_{04}'Y^4 + C_{06}'Y^6 + \\
&\quad C_{22}'X^2Y^2 + C_{44}'X^4Y^4).
\end{aligned} \quad (15)$$

where $c_{ij}'$ represent $c_{ij}$ normalized by $\lambda_o$, and X and Y are normalized coordinates on the hologram plane. And because of the symmetrical property about a point of the aspherical wave, odd terms of $C_{ij}$ and $C_{ij}'$ in equation (15) are canceled and there remain only even terms.

The phase function $\phi_i$ of the reconstructed image wave when this hologram is used is given by $$\phi_i = \phi_c + \mu\{(\phi_o + \phi_G) - \phi_r\} \quad (16)$$

where, $\phi_c$ is the phase function of the reconstructing wave.

In obtaining the coefficients $C_{ij}'$, by use of the direction cosine of $\phi_i$, the direction cosine $l_i$, $m_i$, and $n_i$ of the X-, Y- and Z-axes are obtained from the following equations $$l_i = -\frac{\lambda_c}{2\pi}\left(\frac{\partial \phi_i}{\partial x}\right)_{z=0}$$
$$m_i = -\frac{\lambda_c}{2\pi}\left(\frac{\partial \phi_i}{\partial y}\right)_{z=0}$$
$$n_i = \pm\sqrt{1 - l_i^2 - m_i^2}$$
(17)

where,
+ is for a reflective type hologram, and
− is for a transparent type hologram,
and ray tracing is performed for each wavelength, whereby a dispersion value for each spot diagram is obtained. At this time, the damped least square method, DLS, is used so that the mean value of the dispersion values obtained for the respective wavelengths will become a minimum, and optimum conditions are determined through the calculations repeated the necessary number of times. The ray tracing was conducted at 37 points on the surface of the hologram and as a result of the calculations, the coefficients $c_{ij}'$ corresponding to the optimum aspherical wave front were obtained as:

$$\begin{aligned}
c_{20}' &= 6.8520 \\
c_{40}' &= 2.2317 \\
c_{60}' &= 0.067167 \\
c_{80}' &= -0.73690 \\
c_{22}' &= 1.1857 \\
c_{02}' &= 1.9653 \\
c_{04}' &= 0.72455 \\
c_{06}' &= 0.084426 \\
c_{08}' &= -0.16240 \\
c_{44}' &= -0.024806
\end{aligned}$$
(18)

These coefficients are substituted in equation (15) and $\phi_H$ is determined from equations (12) to (15).

One of the methods for producing the computer generated hologram is to optically plot X and Y and then reduce the same by photography, or to produce the hologram corresponding to the interference fringes by electron beam direct drawing, so that the above $\phi_H$ will become $$\phi_H = 2\pi\mu \quad (\mu: \text{fringe index, integer}) \quad (19)$$

Another method for producing the computer generated hologram is one that prepares only the hologram corresponding to $\phi_G$ for making an aspherical wave front to correct aberration by the use of the computer generated hologram corresponding to $\phi_H$, and then the hologram to be used as the diffraction grating for a multiplexer/demultiplexer is produced by the two-beam interference method. In producing the computer generated hologram for making the aspherical wave front to correct aberration, the sum of the phase function $\phi_G$ corresponding to the aspherical wave front and the phase function corresponding to a plane wave is obtained by means of the computer generated hologram as a hologram having a pattern corresponding to the interference fringes formed by both the wave fronts. If the plane wave is introduced so as to irradiate upon this hologram, the required aspherical wave front is obtained as a diffracted beam of the order one. When this aspherical wave is diverged by a convex lens, a wave front constituted by an aspherical wave and a spherical wave is obtained. Using this as an aspherical object wave, and a spherical wave as a spherical reference wave, a hologram having interference fringes is optically produced, and thus, the hologram corresponding to the phase function $\phi_H$ as shown in equation (12), i.e., that will become the diffraction grating for a multiplexer/demultiplexer is provided.

In the case of FIG. 1, an aspherical wave was first converged and then diverged into a divergent aspherical object wave and this wave was introduced in the direction of the Z axis, and a divergent spherical reference wave was introduced in the direction of and at the angle of 12.12° with respect to the Z axis and thereby the hologram serving as the diffraction grating was produced. Although this hologram has a low diffracting efficiency, the diffracting efficiency can be improved by shaping the grooves into a triangular wave form or saw tooth form by a suitable method such as ion beam etching. The hologram manufactured in the described manner is used as the transparent type diffraction grating 6 as shown in FIG. 2, and an optical signal multiplexed with wavelengths of 800 nm, 820 nm, 840 nm, 860 nm, and 880 nm is introduced so as to irradiate on the same from the input optical fiber 7 through the convergent lens 9. Then, the signal is diffracted and demultiplexed by the diffraction grating 6, whereby a separate optical signal of 800 nm enters the output optical fiber 8a, one of 820 nm enters the output optical fiber 8b, one of 840 nm enters the output optical fiber 8c, one of 860 nm enters the output optical fiber 8d, and one of 880 nm enters the output optical fiber 8e, to be led out therethrough. In the case where the reflective type diffraction grating which is fabricated by applying a reflective film in the form of a thin film of gold onto the surface of the hologram 5 produced by the method as described in connection FIG. 1, the convergent lens is not required as shown in FIG. 3 (A). In this case, the reconstructing wave angle with reference to the principal ray $\theta_c$ is 20.06°, but other conditions are virtually the same as the previous case. It is, however, different in that, at the time of the reconstruction, the image forming point of the split signal with a larger wavelength is shifted in the negative direction of the X axis.

Figure 4:
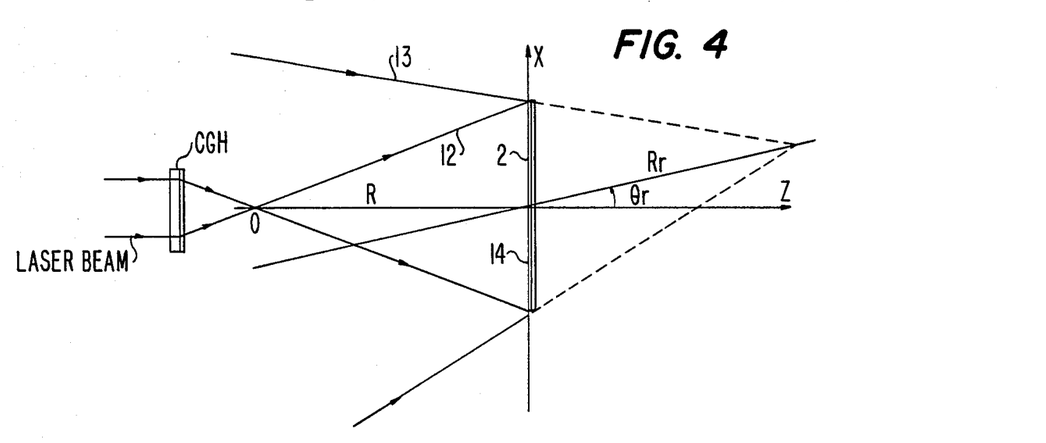
FIG. 4 is a diagram showing a method for producing a hologram by irradiating a divergent aspherical object wave and a convergent spherical reference wave upon a holographic photosensitive layer from one side thereof.
Figure 5:
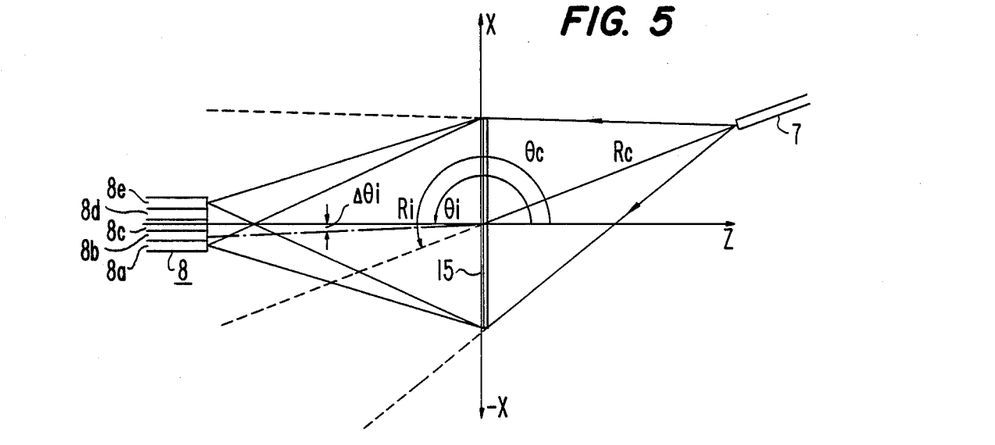
FIG. 5 is a conceptual drawing of a holographic demultiplexer using the hologram produced in FIG. 4 as a transparent type diffraction grating.

If it is desired to eliminate the convergent lens when using the transparent type diffraction grating, a divergent aspherical object wave 12 may be introduced in the direction of the Z axis perpendicular to the holographic photosensitive layer 2 and a convergent spherical reference wave 13 may be introduced in the direction at the angle of $\theta_r$ with respect to the Z axis as exemplified in FIG. 4, and then the layer is exposed and a hologram 14 with interference fringes is produced. If the hologram manufactured in the described manner is used as the transparent type diffraction grating 15 as shown in FIG. 5, and an input optical signal multiplexed with the wavelengths of 800 nm, 820 nm, 840 nm, 860 nm, and 880 nm is introduced from the input optical fiber 7 so as to irradiate upon the transparent type diffraction grating 15, the signal is diffracted and demultiplexed, and thereby a separate optical signal of 800 nm enters the output optical fiber 8a, one of 820 nm enters the output optical fiber 8b, one of 840 nm enters the output optical fiber 8c, one of 860 nm enters the output optical fiber 8d, and one of 880 nm enters the output optical fiber 8e, to be led out therethrough. In this case, in the same way as in the case of FIG. 1 where a divergent aspherical object wave and a divergent spherical reference wave were used, the following conditions are met:

$R_i = R_c = R_o = R_r = 36.74$ mm
$\theta_i = 180°$
$\theta_c = 20.06° + 180°$
$\theta_o = 0°$
$\theta_r = 12.12°$.

Incidentally, if a hologram produced by the method as described in FIG. 4 is provided with a reflective film of a thin film of gold and used as a reflective type diffration grating for a holographic multiplexer/demultiplexer, a convergent lens becomes necessary.

Figure 6:
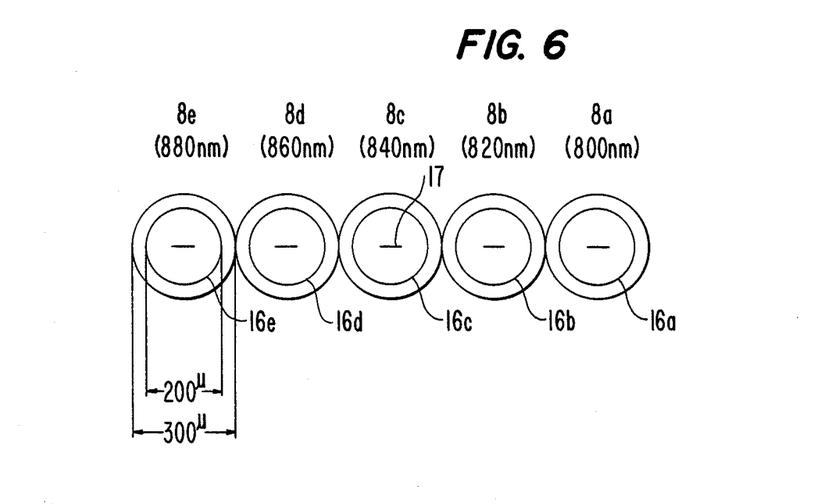
FIG. 6 is a drawing showing distribution of light spots within the output optical fibers obtained by a ray tracing method applied to the diffraction grating in the holographic demultiplexer in FIGS. 2 and 3.

Referring now to FIG. 6, there is shown the distribution of light spots obtained by a ray tracing method applied to the arrangement as shown in FIG. 2, in which the hologram produced by the method as described in FIG. 1 is used as a holographic demultiplexer, by the light spots 17 within the cores 16a, 16b, 16c, 16d, and 16e of the optical fibers. From the result shown, it is known that the diffracted and split beams are contained within the ranges of approximately 30μ virtually in the center of the cores of the output optical fibers. Therefore, there occurs no cross talk due to signals of other wavelengths mixing in the respective cores. Although the description in the foregoing with reference to FIG. 2 to FIG. 5 was made only for the holographic demultiplexers, the demultiplexer in FIG. 3, for example, can operate as a holographic multiplexer, by making group of output optical fibers 8 serve as a group of input optical fibers and the input optical fiber 7 to serve as an output optical fiber, and if then optical signals made up of wavelengths $\lambda_1$, $\lambda_2$, $\lambda_3$, $\lambda_4$, and $\lambda_5$ are introduced through respective optical fibers 8a, 8b, 8c, 8d, and 8e, then they will be diffracted and multiplexed by the reflective type diffraction grating 10 and the composite signal will enter the output optical fiber 7 to be led out therethrough.

Figure 7:
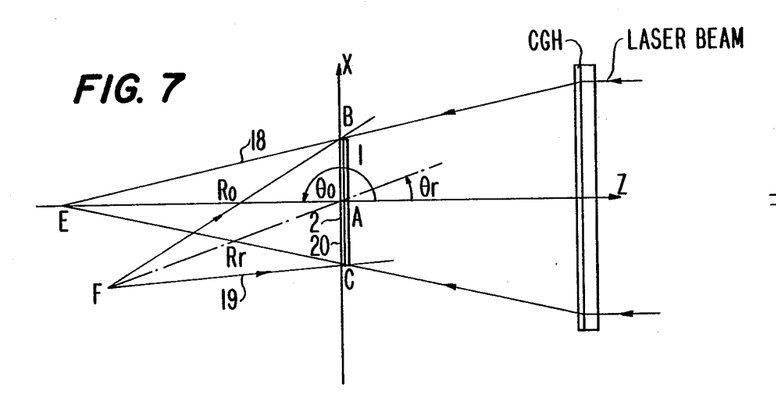
FIG. 7 is a diagram showing a method for producing a hologram by irradiating convergent aspherical object wave and a divergent spherical reference wave upon a holographic photosensitive layer from both sides thereof.
Figure 8:
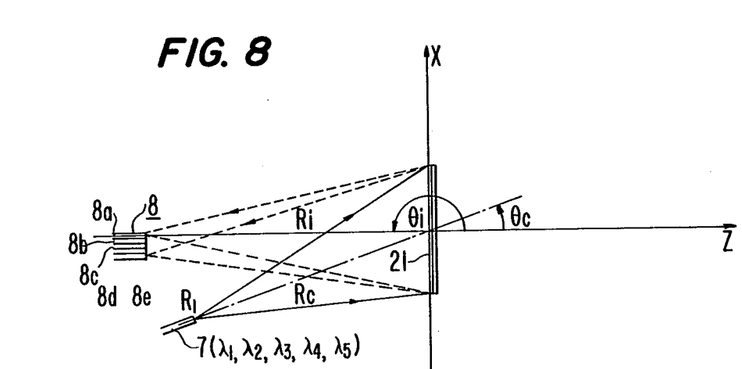
FIG. 8 is a conceptual drawing of a holographic demultiplexer using the hologram produced in FIG. 7 as a diffraction grating.
Figure 9:
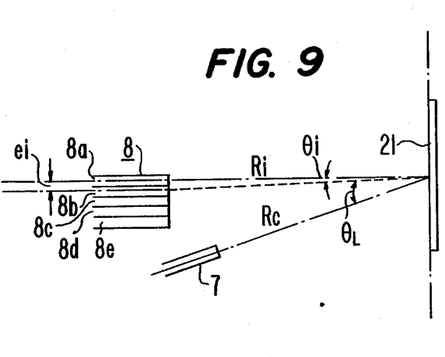
FIG. 9 is a partially enlarged view of FIG. 8.

A second embodiment is shown in FIG. 7 to FIG. 10. In FIG. 7, in which the X axis is on the surface of the holographic photosensitive layer 2 applied onto a transparent substrate 1 and the Z axis is in the direction perpendicular to the above surface, a convergent aspherical object wave 18 is introduced so as to be converged into the point E located in the opposite direction to the Z axis, namely, in the direction at the object wave angle $\theta_0 = 180°$ with reference to the principal ray at the object wave distance $R_0$, and a divergent spherical reference wave 19 is introduced from the side opposite to the convergent aspherical object wave 18 from the point F located in the direction at the reference wave angle $\theta_r$ with reference to the principal ray at the reference wave distance $R_r$, whereby the photosensitive layer is exposed and a hologram 20 formed of interference fringes is produced. The arrangement in FIG. 8 is similar to the arrangement in the method for producing the hologram as described in FIG. 7, that is, the hologram 20 produced in FIG. 7 is made to serve as the diffraction grating 21 in FIG. 8 with the X axis being on the surface of the grating 21 and the Z axis being in the direction perpendicular to that surface, the input optical fiber 7 is oriented in the reconstructing wave angle $\theta_c$, equal to $\theta_r$, and the tip of the input optical fiber 7 is located at the reconstructing wave distance $R_c$, equal to the reference wave distance $R_r$, and then, the fibers of the group 8 of output optical fibers made up of the output optical fibers 8a, 8b, 8c, 8d, and 8e are arranged as shown in FIG. 8 with the output optical fiber 8a placed on the Z axis, i.e., in the direction at the reconstructed image wave angle $\theta_i = 180°$ with reference to the principal ray, and with the tip thereof located at the reconstructed image point distance $R_i$ which is equal to the object wave distance $R_0$. If an input optical signal multiplexed with wavelengths $\lambda_1$, $\lambda_2$, $\lambda_3$, $\lambda_4$, and $\lambda_5$ is introduced through the input optical fiber 7, the signal is diffracted and demultiplexed by the diffraction grating 21 and the separate signals enter the output optical fibers 8a, 8b, 8c, 8d, and 8e corresponding to their wavelengths to be led out therethrough. FIG. 9 is a partially enlarged view of FIG. 8. The arrangement of FIG. 8 and FIG. 9 is determined according to the following equation.

$$\sin \theta_i = \sin \theta_c + (\lambda_c/\lambda_o)(\sin \theta_o - \sin \theta_r) \quad (19)$$

Since, as shown in FIG. 7, the convergent aspherical object wave 18 is made to irradiate upon the surface of holographic photosensitive layer 2 perpendicularly thereto, $\theta_o = 180°$, hence, $\sin \theta_o = 0$.

And, since $\theta_c = \theta_r$ as shown in FIG. 8, we obtain $$\sin \theta_i = \sin \theta_c + \frac{\lambda_c}{\lambda_o}(-\sin \theta_c) \quad (20)$$

$$= \sin \theta_c \left(1 - \frac{\lambda_c}{\lambda_o}\right) = \sin \theta_c \frac{\lambda_o - \lambda_c}{\lambda_o}.$$

From FIG. 9, the distance $e_i$ between two adjacent optical fibers is given by $$e_i = R_i \tan \theta_i \quad (21)$$

$$= R_i \tan \sin^{-1}\left\{\sin \theta_c \left(1 - \frac{\lambda_c}{\lambda_o}\right)\right\}.$$

Therefore, in the case, by way of example, where $\lambda_o = 800$ nm, $\lambda_c = 820$ nm, $R_i = 36.70$ mm, $R_c = 32.20$ mm, and the outer diameter of the optical fiber, i.e., the distance $e_i$ between two adjacent output optical fibers is 300μ, $\theta_c = 19.08°(=\theta_r)$.

That is, the incident beam from the input optical fiber corresponding to the reconstructing wave may be introduced in the direction at 19.08° with respect to Z axis.

In producing the computer generated hologram, as in the case of the previously described first embodiment, $\theta_o = 180°$, $\theta = 19.05°$; $R_o = 36.70$ mm, $R_r = 32.20$ mm, and $\lambda = 800$ nm are introduced in equations (12) to (15) and the phase function $\phi_G$ of the aspherical wave is calculated from equations (16) and (17), and then the coefficients $C_{ij}$ are obtained as $C_{20} = 6.7100$
$C_{40} = 1.4259$
$C_{60} = 0.60353$
$C_{80} = 0.22731$
$C_{02} = 11.813$
$C_{04} = 0.79928$
$C_{06} = 0.27268$
$C_{08} = 0.80916$ $C_{22} = 5.9671$
$C_{44} = 1.8714$.

Figure 10:
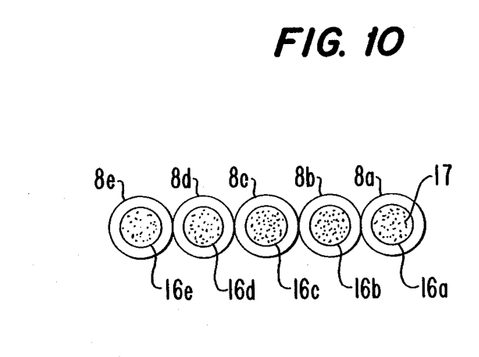
FIG. 10 is a drawing showing distribution of light spots within the output optical fibers obtained by a ray tracing method applied to the diffraction grating in the holographic demultiplexer shown in FIG. 8.

These coefficients are introduced in equation (15) and $\phi_H$ is determined from equations (11) to (14). Further, the hologram to serve as the diffraction grating is produced using equation (19). The thus produced hologram is used as the diffraction grating 21 as shown in FIG. 8 and FIG. 9. If an optical signal multiplexed with wavelengths 800 nm, 820 nm, 840 nm, 860 nm, and 880 nm is introduced from the input optical fiber 7, the optical signal is diffracted and demultiplexed by the diffraction grating 21, and thereby a separate optical signal of 800 nm enters the output optical fiber 8a, one of 820 nm enters the output optical fiber 8b, one of 840 nm enters the output optical fiber 8c, one of 860 nm enters the output optical fiber 8d, and that of 880 nm enters the output optical fiber 8e to be led out therethrough. Distribution of light spots by ray tracing is shown in FIG. 10 by the light spots 17 within the cores of the optical filbers, from which it is known that respective diffracted and demultiplexed beams are contained in the respective cores 16a, 16b, 16c, 16d, and 16e of 200μ in diameter, of the optical fibers 8a, 8b, 8c, 8d, and 8e, 300μ in outer diameter.

Figures 11, 13:
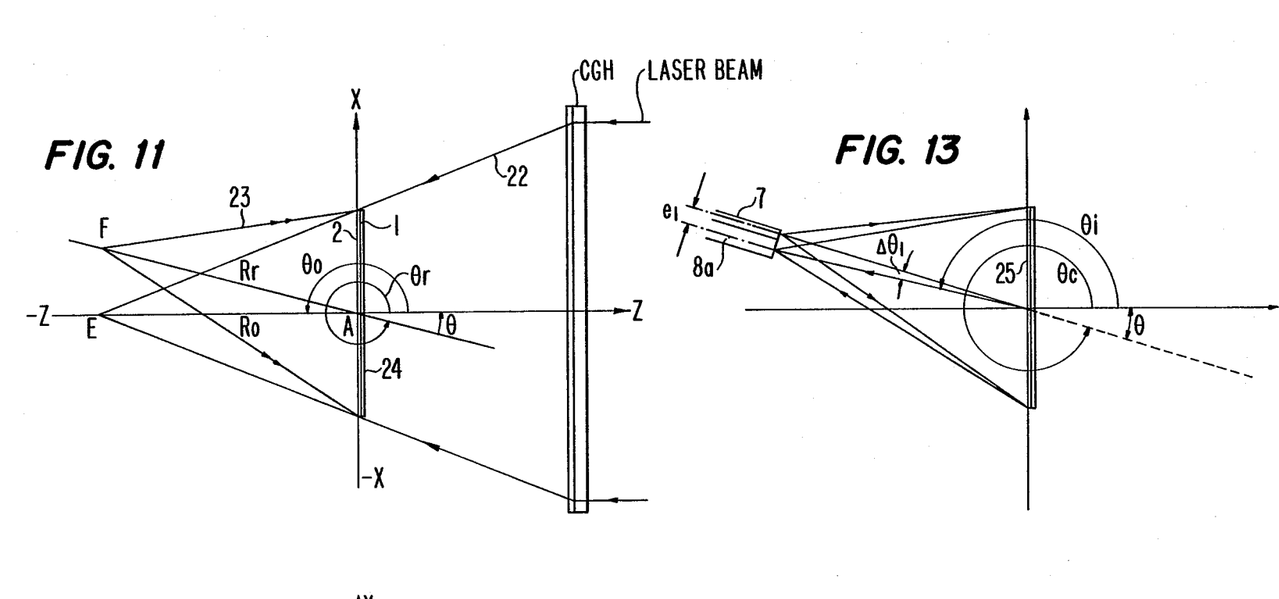
FIG. 11 is a diagram showing a method for producing a hologram by irradiating a convergent aspherical object wave and a divergent spherical reference wave upon a holographic photosensitive layer from both sides thereof.
FIG. 13 is a partially enlarged view of FIG. 12.

A third embodiment will be described in the following with reference to FIGS. 11 to 14. In FIG. 11, in which the Z axis is in the direction perpendicular to the holographic photosensitive layer ·2 applied onto the transparent substrate 1 and the X axis is in the surface of the holographic photosensitive layer 2, an aspherical wave 22 converging into the point E, which is located on the Z axis, that is, in the direction at the object wave angle $\theta_o = 180°$ with reference to the principal ray, and at the object ray distance $R_o$ from the center A of the holographic photosensitive layer, and, from the side opposite to the side of the object wave with reference to the holographic photosensitive layer 2, a divergent spherical reference wave 23 from the point F, which is located in the direction at the reference wave angle $\theta_r$ with reference to the principal ray and at the reference wave distance $R_r$ from the center A of the holographic photosensitive layer, are introduced so as to irradiate upon the holographic photosensitive layer 2 to expose the same, and thereby a hologram 24 with interference fringes is produced.

Figure 12:
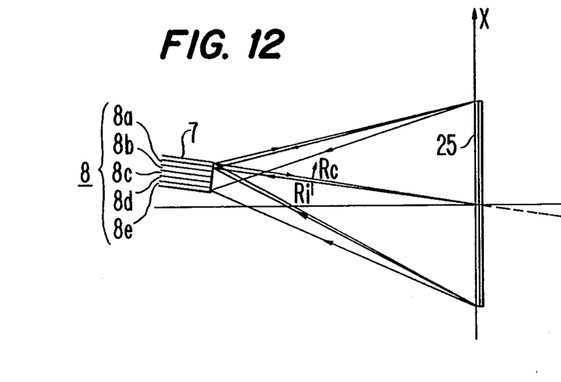
FIG. 12 is a conceptual drawing of a holographic demultiplexer using the hologram produced in FIG. 11 as the diffraction grating with the input optical fiber and the output optical fibers arranged in the manner of the Littrow mounting.

FIG. 12 is a conceptual drawing showing a holographic demultiplexer including a hologram, which was produced by the method as described in FIG. 11 and is serving as a diffraction grating 25, and, disposed opposite thereto, an input optical fiber 7 and an output optical fiber group 8 made up of output optical fibers 8a, 8b, 8c, 8d, and 8e, which are arranged adjacent to each other, namely, arranged in the manner of the Littrow mounting. FIG. 13 is a partially enlarged view of the same. Both FIG. 12 and FIG. 13 show the state in which the incident wave from the input optical fiber 7 is diffracted and demultiplexed by diffraction grating 25 and the separate wavelengths enter the output optical fibers 8a, 8b, 8c, 8d, and 8e to be led out therethrough. The arrangements of FIGS. 11 to 13 are determined by the following image formation formulas and the succeeding calculations.

$$1/R_i = 1/R_c + \mu(1/R_o - 1/R_r) \tag{22}$$

$$\sin\theta_i = \sin\theta_c + \mu(\sin\theta_o - \sin\theta_r) \tag{23}$$

where $\mu = \lambda_c/\lambda_o$.

Let the demultiplexed wavelengths be 820 nm, 840 nm, 860 nm, 880 nm, and 900 nm, the outer diameter of the input optical fiber 125μ, its core diameter 50μ, the outer diameter of the output optical fiber 300μ, and its core diameter 200μ. When, as shown in FIG. 11, the convergent aspherical object wave is converged to the point E on the Z axis and the divergent spherical reference wave is diverged from the point F in the direction at the angle of $-\theta$ with respect to the Z axis, $$\left.\begin{array}{l} \theta_o = \pi \\ \theta_r = 2\pi - \theta. \end{array}\right\} \tag{24}$$

Then, the interval dx of the interference fringes is given by $$\begin{aligned} dx &= \frac{\lambda_o}{\sin\theta_o - \sin\theta_r} \\ &= \frac{\lambda_o}{\sin\theta}. \end{aligned} \tag{25}$$

Then, we obtain $\theta_i$ when $\theta_c \approx \pi + \theta_i$ at $\mu = 1$.

$$\sin\theta_c \approx \sin(\pi + \theta_i) = -\sin\theta_i. \tag{26}$$

From equation (23), $$2\sin\theta_i = \sin\theta$$

$$\sin\theta_i = \sin\theta/2, \tag{27}$$

and $$1 - \cos^2\theta_i = \sin^2\theta/4$$

$$\cos^2\theta_i = 1 - \sin^2\theta/4. \tag{28}$$

The change e in the image forming point position when the wavelength changes by the width $\Delta\lambda_c$ is given by $$\begin{aligned} e &= R_i \Delta\theta_i \\ &= \frac{R_i \Delta\lambda_c}{dx \cos\theta_i} \\ &= \frac{R_i \Delta\lambda_c}{\lambda_o} \cdot \frac{\sin\theta}{\cos\theta_i} \end{aligned}$$

$$e^2 = \left(\frac{R_i \Delta\lambda_c}{\lambda_o}\right)^2 \frac{4\sin^2\theta}{4 - \sin^2\theta}.$$

Therefore, $$4 - \sin^2\theta = \left(\frac{2R_i \Delta\lambda_c}{e\lambda_o}\right)^2 \sin^2\theta$$

$$\sin\theta = \frac{2}{\sqrt{1 + (2R_i\Delta\lambda_c/e\lambda_o)^2}}.$$

Supposing $\lambda_o = 0.84\mu$, $\Delta\lambda_c = 0.02\mu$, $R_i = 50$ mm, and $e = 300$ μm, we obtain $$\sin\theta = 0.250023$$

$\theta = 14.48°$.

And we obtain from equation (25)

$dx = 3.36\mu$, from equation (27)

$\theta_i = \pi - 7.18°$, and from equation (24)

$\theta_r = 2\pi - \theta = 2\pi - 14.48°$, and thus the reference wave angle $\theta_r$ with reference to the principal ray is determined.

The distance $e_i$ between the input optical fiber and the adjacent output optical fiber is, as shown in FIG. 13, given by $e_i = \frac{1}{2}(300 + 125) = 212.5\mu$, and therefore, the angle $\Delta\theta_1$ between the input optical fiber and the adjacent output optical fiber is given by $$\begin{aligned} \Delta\theta_1 &= e_i/R_i \\ &= 212.5/(50 \times 10^{-3}) \\ &= 0.00425 \\ &= 0.24351°. \end{aligned}$$

When $\lambda_o = 0.84\mu$, $\lambda_c = 0.90\mu$, $R_i = 50$ mm, supposing approximately $\Delta\theta_1 \approx 0$ in $\theta_i = \theta_c - \pi + \Delta\theta_1$, we obtain $\theta_i = \theta_c - \pi$.

From equation (23)

$$\left. \begin{aligned} \sin\theta_i &= \sin\theta_c + \mu(\sin\theta_o - \sin\theta_r) \\ &= \sin\theta_c + 0.90/0.84 \times \sin 14.48° \\ \sin\theta_i &= 0.133951 \\ \theta_i &= \pi - 7.69797 \\ \theta_c &= 2\pi - 7.69797 \end{aligned} \right\} \quad (30)$$

From equations (29), with $\Delta\theta_1 = 0.24351°$ taken into consideration, equations (30) become $$\begin{aligned} \theta_i &= \pi - (7.69797 - \Delta\theta/2) \\ &= \pi - 7.576 \end{aligned} \quad (31)$$

$$\begin{aligned} \theta_c &= 2\pi - (7.69797 + \Delta\theta/2) \\ &= 2\pi - 7.819. \end{aligned} \quad (32)$$

In order to reduce aberration, the reconstructed image point distance $R_i$, reconstructing wave distance $R_c$, object wave distance $R_o$, and the reference wave distance $R_r$ were made to be $R_i = R_c = R_o = R_r$.

The computer generated hologram was produced similarly to that in the previous embodiment. As the result, the coefficients $C_{ij}$ corresponding to optimum aspherical wave front were obtained as $C_{20}' = -23.209$
$C_{40}' = -8.3980$
$C_{60}' = -4.7477$
$C_{80}' = 3,1886$
$C_{22}' = 8.3375$
$C_{44}' = 0.61955$
$C_{02}' = -1.5165$
$C_{04}' = 0.29538$
$C_{06}' = -3.9734$
$C_{08}' = -1.2729$.

Introducing these coefficients in equation (15), $\phi_H$ is determined from equations (12) to (15). Further, by plotting X and Y using equation (19), the interference fringes forming the diffraction grating can be obtained.

Figure 14:
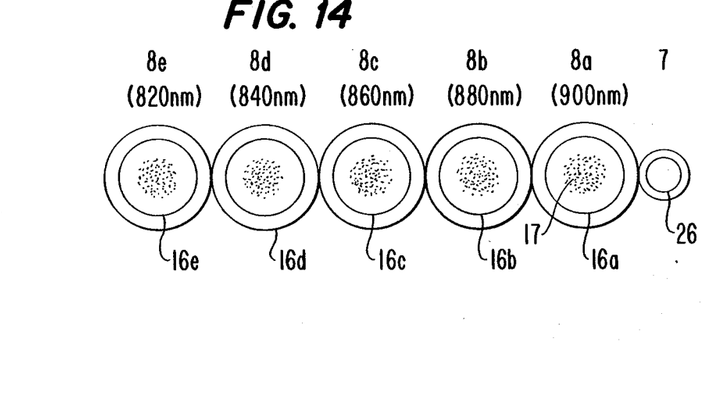
FIG. 14 is a drawing showing distribution of light spots within the output optical fibers obtained by a ray tracing method applied to the diffraction grating in the holographic demultiplexer shown in FIG. 12.

When an optical signal multiplexed with wavelengths 820 nm, 840 nm, 860 nm, 880 nm, and 900 nm is introduced through the input optical fiber 7 in the holographic demultiplexer disposed as indicated in FIGS. 11 and 12, i.e., in the the manner of the Littrow mounting, with the hologram manufactured by the method as described in FIG. 11 used as the diffraction grating, the signal is diffracted and demultiplexed by the diffraction grating 25 and the wavelength of 900 nm is directed into the output optical fiber 8a, that of 880 nm into the output optical fiber 8b, that of 860 nm into the output optical fiber 8c, that of 840 nm into the output optical fiber 8d, and that of 820 nm into the output optical fiber 8e, and led out therethrough. The distribution of the beams within the output optical fiber at that time is shown in FIG. 14 by light spots 17 within the cores 16a, 16b, 16c, 16d, and 16e as a distribution of light spots by ray tracing.

Figure 15:
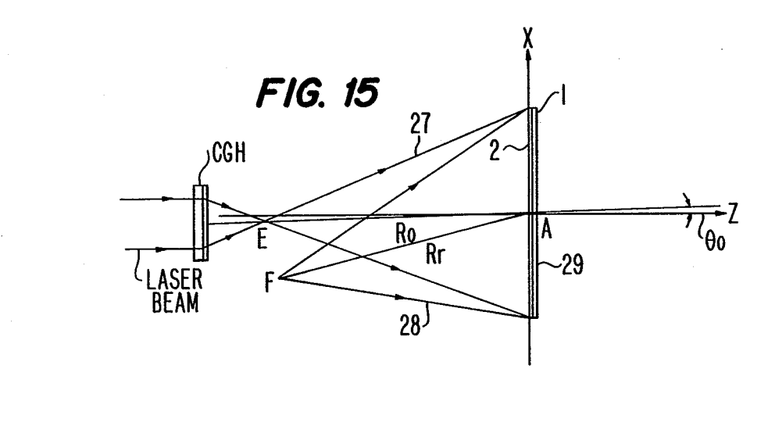
FIG. 15 is a diagram showing a method for producing a hologram by irradiating a divergent aspherical object wave and a divergent spherical reference wave upon a holographic photosensitive layer from one side thereof.

A fourth embodiment will be described in the following with reference to FIGS. 15 to 18. In FIG. 15, in which the Z axis is in the direction perpendicular to the holographic photosensitive layer 2 applied onto the transparent substrate 1 and the X axis is in the surface of the holographic photosensitive layer 2 perpendicularly to the Z axis, a divergent aspherical object wave 27 is introduced from the point E, which is located at the object wave distance $R_o$ from the center A of the holographic photosensitive layer in the direction at the object wave angle $\theta_o$ with reference to the principal ray with respect to the Z axis, and a divergent spherical reference wave 28 is introduced from the point F, which is located on the same side as the point E with reference to the holographic photosensitive layer 2, at the reference wave distance $R_r$ from the center A, and in the direction at the reference wave angle $\theta_r$ with reference to the principal ray with respect to the Z axis, so as to expose the holographic photosensitive layer 2, and a hologram 29 formed of interference fringes is provided.

Figure 16:
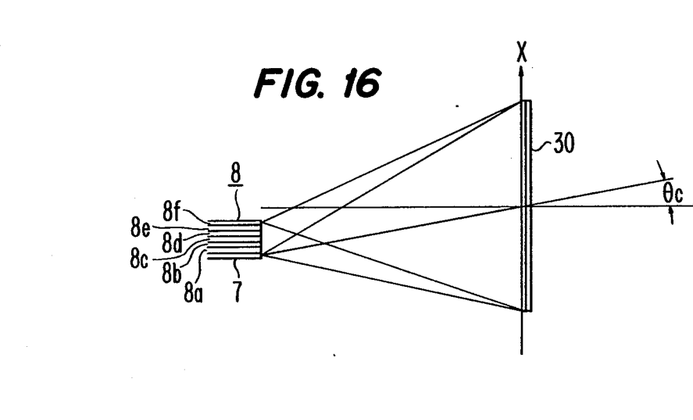
FIG. 16 is a conceptual drawing of a holographic demultiplexer using the hologram produced in FIG. 15 as the diffraction grating with the input optical fiber and the output optical fibers arranged in the manner of the Littrow mounting.
Figure 17:
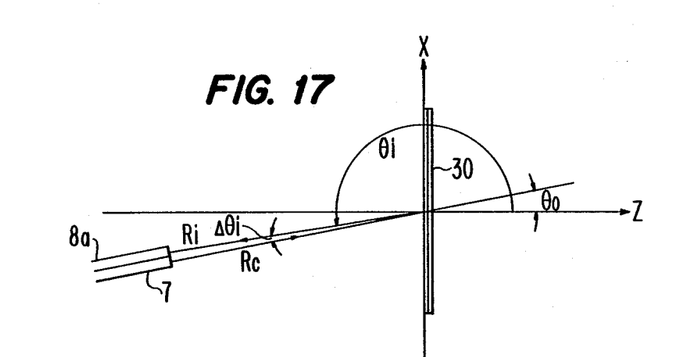
FIG. 17 is a partially enlarged view of FIG. 16.
Figure 18:
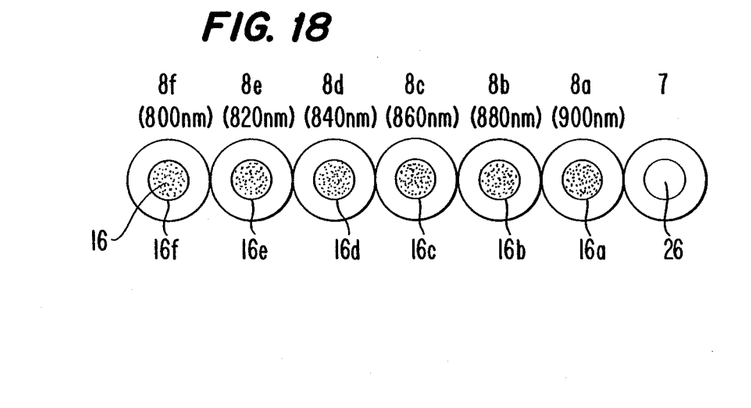
FIG. 18 is a drawing showing distribution of light spots within the output optical fibers obtained by a ray tracing method applied to the diffraction grating in the holographic demultiplexer shown in FIG. 16.

FIG. 16 is a conceptual drawing of a holographic demultiplexer in which a hologram, which was produced by the method as described in FIG. 15 and then provided with a reflecting thin film of gold, is used as a reflective type diffraction grating 30, and, opposite thereto, an input optical fiber 7 and an output optical fiber group 8 made up of output optical fibers 8a, 8b, 8c, 8d, 8e, and 8f are disposed adjacent to each other, i.e., in the manner of the so-called Littrow mounting. FIG. 17 is a partially enlarged view of the same. Both FIG. 17 and FIG. 18 show the state in which the incident wave from the input optical fiber 7 is diffracted and demultiplexed by the diffraction grating 30 and the separate wavelengths enter the output optical fibers 8a, 8b, 8c, 8d, 8e, and 8f to be led out therethrough. The arrangement in FIGS. 15 to 17 is determined by equations (1) and (2) and the following calculations.

The wavelengths to be demultiplexed were six, i.e., 800 nm, 820 nm, 840 nm, 860 nm, 880 nm, and 900 nm, and hence the interval between the wavelengths $\Delta\lambda_c=20$ nm, and the outer diameters of the input and output optical fibers each were $e=125$ μm, their core diameters 50 μm, their NA (numerical aperture) 0.2, and the blaze wavelength $\lambda_B$ of the grating $\lambda_B=0.84$ μm. The record wavelength $\lambda_o$ was made to be 0.488 μm from the Ar laser and the size of the demultiplexer was made to be 20×20 mm.

First, in order to reduce the aberration such as spherical aberration and comatic aberration, the object wave distance $R_o$, reference wave distance $R_r$, reconstructed image point distance $R_i$, and the reconstructing wave distance $R_c$ were made to be $$R_o=R_r=R_i=R_c. \tag{33}$$

When, as indicated in FIG. 17, the angle between the reconstructing wave angle $\theta_c$ with reference to the principal ray and the reconstructed image wave angle $\theta_i$ with reference to the principal ray is denoted by $\Delta\theta_i$, the change in the image forming point corresponding to the change in the wavelength $\Delta\theta_c$ is equal to the outer diameter of the optical fiber in the Littrow mounting. Therefore $$e = R_i\Delta\theta_i = \frac{R_i\Delta\lambda_c}{dx\,\cos\theta_i}, \tag{34}$$

hence $$e^2 = \left(\frac{R_i\Delta\lambda_c}{dx\,\cos\theta_i}\right)^2. \tag{35}$$

By approximation $$dx = \sqrt{(R_i\Delta\lambda_c/e)^2 + (\lambda_c/2)^2}. \tag{36}$$

Since $R_i=50$ mm, $\Delta\lambda_c=200$ μm, the reconstruction wavelength $\lambda_c=0.84$ μm, and $e=125$ μm, $$dx=8.011\ \mu m. \tag{37}$$

The blaze angle $\theta_B$ is given, from $$2dx\,\sin\theta_B=\lambda_B, \tag{38}$$

as $$\sin\theta_B=\lambda_B/2dx=0.05243\,\theta_B=3.005°. \tag{39}$$

$\theta_i$ to give, in the Littrow mounting, $$\theta_i=\theta_c+\pi(180°)$$

at $\lambda_c=0.90$ μm is obtained from $$\sin\theta_i=0.9/2dx=0.05617,$$

and therefore, $$\theta_i=3.2202°+\pi. \tag{40}$$

Then, $\theta_o$ and $\theta_r$ to give $d=8.011$ μm and $$(\theta_i-\pi)-\theta_o=\theta_r-(\theta_i-\pi) \tag{41}$$

are obtained as follows. Since $$\theta_0=2\theta_i-\theta_r-2\pi$$
$$=6.4404-\theta_r-2\pi, \tag{42}$$

and $$\sin\theta_r-\sin\theta_o=\lambda_o/d, \tag{43}$$

from equations (42) and (43), we obtain $$\theta_o=1.472° \tag{44}$$

$$\theta_r=4.968°. \tag{45}$$

In order that the input optical fiber and the output optical fiber have $e=125$ μm apart, with the angle between the reconstructing wave from the optical fiber 7 and the reconstructed image wave to the optical fiber 8a in FIG. 17 denoted by $\Delta\theta_i$ and the reconstructed image point distance $R_i$ supposed to be $R_i=50$ mm, $$\begin{aligned}\Delta\theta_i &= e/R_i \\ &= 0.0025 \\ &= 0.14324°.\end{aligned} \tag{46}$$

therefore, the actual reconstructed image wave angle $\theta_i$ and reconstructing wave angle $\theta_c$ are expressed as $$\begin{aligned}\theta_i &= 3.2202° - 0.14324°/2 + \pi \\ &= 3.149° + \pi\end{aligned} \tag{47}$$

$$\begin{aligned}\theta_c &= 3.2202° + 0.14324°/2 \\ &= 3.292°\end{aligned} \tag{48}$$

If, as the second design, a same calculation as above is performed by making $R_i=25$ mm and the size of the diffraction grating is 10×10 mm, we obtain $$\left.\begin{aligned}dx&=4.022\ \mu m\\ \theta_B&=5.994°\\ \theta_i&=6.424°\\ \theta_r&=9.924°\\ \theta_o&=2.924°\end{aligned}\right\} \tag{49}$$

$\theta_c=6.567°$
$\theta_i=6.281°+180°$
$R_o=R_r=R_c=R_i=25$ mm.

The making of the computer generated hologram is carried out quite the same as the above described method. As the result thereof, the coefficients $C_{ij}$, for the phase function of the aspherical wave front for the first design were obtained as $C_{20}'=-5.6397$
$C_{40}'=-2.3723$
$C_{60}'=0.3254$
$C_{80}'=2.4964$
$C_{02}'=7.2956$
$C_{04}'=1.7462$
$C_{06}'=-1.6233$ $C_{08}' = -2.1286$
$C_{22}' = 2.0982$
$C_{44}' = 0.86606$.

The phase function of the hologram is determined using these values.

When an optical signal multiplexed with wavelengths 800 nm, 820 nm, 840 nm, 860 nm, 880 nm, and 900 nm is introduced from the input optical fiber 7 in the holographic demultiplexer arranged as shown in FIGS. 16 and 17, i.e., in the manner of the Littrow mounting, with the hologram 29 manufactured by the method as described in FIG. 15, and then provided with a thin film of gold, used as the reflective type diffraction grating 30, the signal is diffracted and demultiplexed by the diffraction grating 30 and the wavelength of 900 nm enters the output optical fiber 8a, that of 880 nm enters the output optical fiber 8b, that of 860 nm enters the output optical fiber 8c, that of 840 nm enters the output optical fiber 8d, that of 820 nm enters the output optical fiber 8e, and that of 800 nm enters the output optical fiber 8f, to be led out therethrough. The distribution of the beams within the output optical fibers at that time is shown in FIG. 18 by light spots 17 within the cores 16a, 16b, 16c, 16d, 16e, and 16f as a distribution of light spots by ray tracing. Although five or six wavelength multiplexing was described in the above described embodiments, holographic multiplexer/demultiplexers of higher degree of multiplexing with ten wavelengths or more can be manufactured by optimum designing. And, while the holograms in the above described embodiments were produced by interference of an aspherical wave and a spherical wave, it is a matter of course that such hologram can also be produced by interference of an aspherical wave which has been obtained by slightly modifying a spherical wave and an aspherical wave. Therefore, the hologram to serve as the diffraction grating can be manufactured even by interference between an one aspherical wave and another aspherical wave. Further, although holograms in a plane form only were described in the above description of embodiments, those shaped in the form of concave surface or cylindrical curved surface are of course applicable without departing the spirit of the present invention.

What is claimed is:

1. A holographic multiplexer comprising:
   a plurality of input optical fibers which respectively radiate optical signals having different wavelengths which are transmitted therethrough;
   a diffraction grating means for diffracting the optical signals radiated from the input optical fibers so that the diffracted optical signals converge to one point; and
   a single output optical fiber disposed at said one point to receive and transmit the diffracted optical signals as one multiplexed optical signal containing the different wavelengths,
   said diffraction grating means being constituted by a hologram having a pattern of interference between two light waves, at least one of said two light waves being an aspherical wave.

2. A holographic multiplexer according to claim 1, wherein said diffraction grating means is constituted by a hologram having a pattern of interference between an aspherical light wave and a spherical light wave.

3. A holographic multiplexer according to claim 1, wherein said diffraction grating means is constituted by a hologram having a pattern of interference between two aspherical light waves.

4. A holographic multiplexer according to claim 1, wherein said aspherical wave is substantially a combination of an aspherical wave and a spherical wave.

5. A holographic multiplexer according to claim 1, wherein said hologram is a hologram produced by irradiating a holographic photosensitive material by two light waves at least one of which has an aspherical wave front.

6. A holographic multiplexer according to claim 5, wherein the light wave having said aspherical wave front is produced by passing a light wave having a plane wave front through a computer generated hologram having a pattern of interference between two light waves one of which is an aspherical wave.

7. A holographic multiplexer according to claim 1, wherein said hologram is a hologram produced from a computer generated hologram.

8. A holographic multiplexer according to claim 1, wherein said diffraction grating means has on one surface thereof a reflective film, whereby said diffraction grating means is a reflective type diffraction grating.

9. A holographic multiplexer according to claim 1, wherein said diffraction grating means is planar.

10. A holographic multiplexer according to claim 1, wherein said input and output optical fibers are arranged in a manner of the Littrow mounting.

11. A holographic demultiplexer comprising:
    a single input optical fiber which radiates a multiplexed optical signal containing a plurality of optical signals having different wavelengths which are transmitted therethrough;
    a diffraction grating means for diffracting the multiplexed optical signal radiated from the input optical fiber so that the plurality of optical signals are respectively diffracted to different points dependent upon the respective wavelengths; and
    a plurality of output optical fibers respectively disposed at said different points to respectively receive and transmit the diffracted plurality of optical signals,
    said diffraction grating means being constituted by a hologram having a pattern of interference between two light waves, at least one of said two light waves being an aspherical wave.

12. A holographic demultiplexer according to claim 11, wherein said diffraction grating means is constituted by a hologram having a pattern of interference between an aspherical light wave and a spherical light wave.

13. A holographic demultiplexer according to claim 11, wherein said diffraction grating means is constituted by a hologram having a pattern of interference between two aspherical light waves.

14. A holographic demultiplexer according to claim 11, wherein said aspherical wave is substantially a combination of an aspherical wave and a spherical wave.

15. A holographic demultiplexer according to claim 11, wherein said hologram is a hologram produced by irradiating a holographic photosensitive material by two light waves at least one of which has an aspherical wave front.

16. A holographic demultiplexer according to claim 15, wherein the light wave having said aspherical wave front is produced by passing a light wave having a plane wave front through a computer generated hologram having a pattern of interference between two light waves one of which is an aspherical wave.

17. A holographic demultiplexer according to claim 11, wherein said hologram is a hologram produced from a computer generated hologram.

18. A holographic demultiplexer according to claim 11, wherein said diffraction grating means has on one surface thereof a reflective film, whereby said diffraction grating means is a reflective type diffraction grating.

19. A holographic demultiplexer according to claim 11, wherein said diffraction grating means is planar.

20. A holographic demultiplexer according to claim 11, wherein said input and output optical fibers are arranged in a manner of the Littrow mounting.

* * * * *